(12) United States Patent
Byrne et al.

(10) Patent No.: US 9,691,153 B1
(45) Date of Patent: Jun. 27, 2017

(54) SYSTEM AND METHOD FOR USING IMAGE DATA TO DETERMINE A DIRECTION OF AN ACTOR

(71) Applicant: Google Inc., Mountain View, CA (US)

(72) Inventors: Paul Vincent Byrne, Los Altos Hills, CA (US); Daniel Aden, Redwood City, CA (US)

(73) Assignee: Google Inc., Mountain View, CA (US)

( * ) Notice: Subject to any disclaimer, the term of this patent is extended or adjusted under 35 U.S.C. 154(b) by 63 days.

(21) Appl. No.: 14/919,700

(22) Filed: Oct. 21, 2015

(51) Int. Cl.
*G06K 9/00* (2006.01)
*G06T 7/00* (2017.01)
(Continued)

(52) U.S. Cl.
CPC .......... *G06T 7/0042* (2013.01); *G06T 1/0014* (2013.01); *G06T 17/20* (2013.01);
(Continued)

(58) Field of Classification Search
CPC ... G06T 1/0014; G06T 7/0042; G06T 7/0051; G06T 7/0065; G06T 7/0071; G06T 7/2033; G06T 7/593; G06T 7/73; G06T 11/00; G06T 11/60; G06T 13/00–13/20; G06T 13/40–13/80; G06T 15/00; G06T 15/04; G06T 15/10–15/205; G06T 17/00; G06T 17/10; G06T 17/20–17/30; G06T 19/00; G06T 2200/04; G06T 2200/08;
(Continued)

(56) References Cited

U.S. PATENT DOCUMENTS 7,831,087 B2 * 11/2010 Harville ............. G06K 9/00201
382/103
8,577,126 B2   11/2013 Jones et al.
(Continued)

FOREIGN PATENT DOCUMENTS

WO   2015040503 A1   3/2015

OTHER PUBLICATIONS

Musleh et al., "Identifying and Tracking Pedestrians Based on Sensor Fusion and Motion Stability Predictions", Sensors, pp. 8030-8031, Aug. 27, 2010.
(Continued)

*Primary Examiner* — Jose Couso
(74) *Attorney, Agent, or Firm* — McDonnell Boehnen Hulbert & Berghoff LLP

(57) ABSTRACT

Example systems and methods are disclosed for determining the direction of an actor based on image data and sensors in an environment. The method may include receiving point cloud data for an actor at a location within the environment. The method may also include receiving image data of the location. The received image data corresponds to the point cloud data received from the same location. The method may also include identifying a part of the received image data that is representative of the face of the actor. The method may further include determining a direction of the face of the actor based on the identified part of the received image data. The method may further include determining a direction of the actor based on the direction of the face of the actor. The method may also include providing information indicating the determined direction of the actor.

20 Claims, 7 Drawing Sheets

(51) Int. Cl.
*G06T 17/20* (2006.01)
*H04N 5/232* (2006.01)
*G06T 1/00* (2006.01)

(52) U.S. Cl.
CPC ............ *H04N 5/23229* (2013.01); *G06T 2207/10004* (2013.01); *G06T 2207/10028* (2013.01); *G06T 2207/30201* (2013.01)

(58) Field of Classification Search
CPC ............ G06T 2200/24; G06T 2200/28; G06T 2200/32; G06T 2207/10016; G06T 2207/30196; G06T 2207/30231; G06T 2207/30232; G06T 2215/06; H04N 7/18–7/185; H04N 13/00; H04N 13/0239–13/025; H04N 13/026; H04N 13/0271–13/0275; H04N 21/441; H04N 21/44218; G06K 9/00201; G06K 9/00214; G06K 9/00248; G06K 9/00255; G06K 9/00268; G06K 9/00281; G06K 9/00288; G06K 9/00302; G06K 9/00308; G06K 9/00315; G06K 9/00335; G06K 9/00342; G06K 9/00348; G06K 9/00362; G06K 9/00369; G06K 2009/00738; G06F 17/30817; Y10S 901/01; Y10S 901/46; Y10S 901/47; B25J 9/1676; B25J 9/1689; B25J 9/1694; B25J 9/1697; G01B 11/026; G01S 7/4802; G01S 17/89

See application file for complete search history.

(56) References Cited

U.S. PATENT DOCUMENTS

| | | |
|---|---|---|
| 8,971,635 B2 | 3/2015 | Kodaira et al. |
| 9,079,311 B2 | 7/2015 | Wang et al. |
| 9,098,738 B2 | 8/2015 | Bilet et al. |
| 2004/0153671 A1 | 8/2004 | Schuyler et al. |
| 2012/0075464 A1 | 3/2012 | Derenne et al. |
| 2013/0148853 A1 | 6/2013 | Hwang et al. |
| 2013/0181892 A1 | 7/2013 | Liimatainen et al. |
| 2013/0182905 A1 | 7/2013 | Myers et al. |
| 2013/0289449 A1 | 10/2013 | Stone et al. |
| 2014/0049769 A1 | 2/2014 | Zheleznyak |
| 2015/0088310 A1 | 3/2015 | Pinter et al. |

OTHER PUBLICATIONS

Takeuchi, "Design of a 3D Interface Using a Markerless Paper in Augmented Reality Environments", University of Tokyo, p. 29, 2013.

\* cited by examiner

SYSTEM AND METHOD FOR USING IMAGE DATA TO DETERMINE A DIRECTION OF AN ACTOR

BACKGROUND

Physical spaces may be used for retail, manufacturing, assembly, distribution, office space, and/or other purposes. The design and operation of these physical spaces is becoming more intelligent, more efficient, and more intuitive. As technology becomes increasingly prevalent in modern life, using technology to enhance physical spaces becomes more apparent. Thus, a demand for enhanced physical spaces has increased innovation in sensing techniques, data processing, software, and user interface design.

SUMMARY

Example systems and methods may provide for determining a direction of an actor based on image data and sensors within an environment. The environment may include sensors, such as LIDAR sensors, that receive point cloud data representative of an actor at a location. The environment may also include image capture devices, such as a camera, that receives image data of the location. The image data may include the face of the actor. The system may determine a direction of the actor based on the point cloud data and the image data with the face of the actor.

After receiving the point cloud data and the image data of the location, the system may link the image data to the point cloud data based on the location. The system may then identify a part of the image data that includes a face of the actor. The system may determine a direction that the face of the actor is oriented. Based on the determined direction, the system may infer a direction of the actor. In some cases, the system may determine that the direction of the actor is the same as the direction of the face, while in other cases, the system may determine that the two directions are different.

In one example, a method is provided that includes receiving point cloud data for an actor at a first location in an environment, wherein the point cloud data includes a plurality of points representative of the actor. The method may also include receiving image data corresponding to the point cloud data for the actor based on the image data being representative of the first location in the environment. The method may additionally include identifying a portion of the received image data that is representative of a face of the actor. The method may also include determining a direction of the face of the actor based on the identified portion of the received image data. The method may further include determining a direction of the actor based on the direction of the face of the actor. The method may even further include providing information indicating the determined direction of the actor.

In an additional example, a non-transitory computer readable medium is provided that stores instructions that are executable by one or more computing devices. When the instructions are executed, the instructions cause the one or more computing devices to perform functions that include receiving point cloud data for an actor at a first location in an environment, wherein the point cloud data includes a plurality of points representative of the actor. The functions may also include receiving image data corresponding to the point cloud data for the actor based on the image data being representative of the first location in the environment. The functions may also include identifying a portion of the received image data that is representative of a face of the actor. The functions may also include determining a direction of the face of the actor based on the identified portion of the received image data. The functions may further include determining a direction of the actor based on the direction of the face of the actor. The functions may include providing information indicating the determined direction of the actor.

In another example, a robotic device is disclosed that includes one or more processors and a memory that stores instructions that are executed by the one or more processors. When executed, the instructions cause the robotic device to perform functions that include receiving point cloud data for an actor at a first location in an environment, wherein the point cloud data includes a plurality of points representative of the actor. The functions may also include receiving image data corresponding to the point cloud data for the actor based on the image data being representative of the first location in the environment. The functions may also include identifying a portion of the received image data that is representative of a face of the actor. The functions may also include determining a direction of the face of the actor based on the identified portion of the received image data. The functions may further include determining a direction of the actor based on the direction of the face of the actor. The functions may even further include adjusting operation of the robotic device based on the determined direction of the actor.

In a further example, a system may include means for receiving point cloud data for an actor at a first location in an environment, wherein the point cloud data includes a plurality of points representative of the actor. The system may also include means for receiving image data corresponding to the point cloud data for the actor based on the image data being representative of the first location in the environment. The system may additionally include means for identifying a portion of the received image data that is representative of a face of the actor. The system may also include means for determining a direction of the face of the actor based on the identified portion of the received image data. The system may further include means for determining a direction of the actor based on the direction of the face of the actor. The system may even further include means for providing information indicating the determined direction of the actor.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
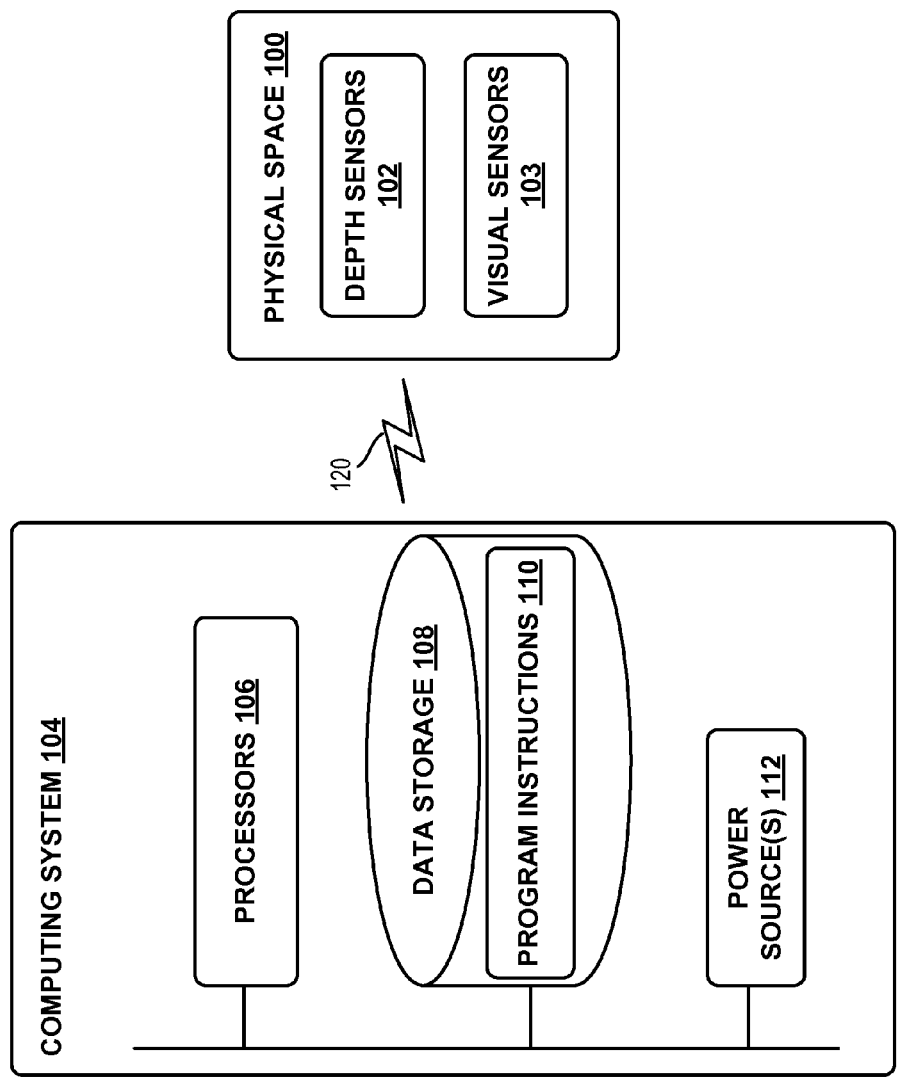
FIG. 1 illustrates a configuration of a system for determining a direction of an actor based on image data and sensors in an environment, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

For a system that detects actors (such as people, robots, etc.) within a space (such as a 20 meter by 20 meter room), it may be useful to determine additional information about one or more actors within the space. For example, identifying a direction that an actor in the space is oriented may be useful. Determining this information, however, may be challenging for at least three reasons.

First, the system may detect people within the space using acquired sensor data (such as sensor data from LIDAR sensors) that provides limited information about the actor. Second, the collected sensor data may be sparse: there may not be many data points collected by the system. Third, the density of the acquired data points may be non-uniform. For example, some areas may have high point density while other areas have low point density. Thus, it may be challenging to determine additional information about people detected within the space.

To overcome this challenge, a method may be executed by a system relying on one or more LIDAR sensors and one or more image capturing devices (such as cameras). The system may be able to detect people and/or faces of people to determine the direction of the detected face and/or actor. The method may begin by obtaining point cloud data representative of an actor at a location in a space from LIDAR sensors within the space. The method may continue by obtaining image data of the location and identifying a portion of the image data that includes a face of the actor at the location. The image data may be obtained from one or more cameras in the space.

The method may continue by mapping the image data of the actor to the corresponding point cloud data for the actor. The method may then include determining the direction of the detected face of the actor based on the image data of the face. After this step, the method may proceed to determining the direction of an actor based on the direction of the face of the actor and the point cloud data for the actor.

By executing the above method, the system can determine information about detected actor(s) within the space. First, the system may determine the direction that the face of an actor is oriented. Next, the system may infer the direction that an actor is oriented or moving based on the determined direction of the face of the actor. Additionally, the system may determine the direction of a body of the actor. In some cases, the system may rely on a bounding box drawn around the torso of the actor to determine the direction the torso is oriented. The system may also determine that the direction that the face is oriented differs from the direction that the torso is oriented. Other information may also be determined by the system.

The system may rely on one or more LIDAR sensors to acquire point cloud data about the actor(s) within the space. The point cloud data may include a plurality of points, each of which represents a point on the surface of the actor. The LIDAR data acquired may be sparse, in some embodiments. The point cloud data may also have a non-uniform density. Because the point cloud data is sparse with a non-uniform density, the system may rely on other types of sensors to acquire sensor data to make inferences about the actors within the space.

The system may rely on one or more camera sensors to detect faces of the one or more actors within the space. Based on the detected faces, the system may then make inferences regarding the direction the face of the actor is oriented, the direction the actor is oriented, the direction the actor is moving, and/or the direction the torso of the actor is oriented. The system may rely on one or more image capture devices, such as cameras. Multiple cameras may be used to acquire image data and reduce errors present in the captured image data. Various types of image capture sensors can be used, including PTZ cameras (pan-tilt-zoom), stationary cameras, moving cameras, RGB cameras, infrared cameras, and/or other types of image capture devices.

Mapping image data including a face of an actor may be preferred for at least two reasons. First, image data of a face of an actor that may be a relatively easy portion of image data to recognize within image data representative of an actor. In particular, image data of facial features of an actor may be relatively easy to distinguish from other image data representative of an actor. Second, image data of a face of an actor may provide rich, detailed information about the actor, such as the direction the face of the actor is oriented. For at least these two reasons, image data of the face of the actor may be helpful for making inferences about the point cloud data representative of the actor.

The inferred information (such as the direction an actor's face is oriented) may be useful for various applications. For example, a robotic device operating in the space may require information about the direction of an actor's face to execute tasks. In particular, while the robot may navigate the space by using information about the presence of the actor in the space, the robot may execute tasks for telepresence (such as communicating with the actor) using information indicating the direction that the actor's face is oriented.

For another example, videoconferencing may be more effective by using information indicating the direction an actor's face is oriented. In particular, a remote camera angle and/or location may be adjusted based on changes in the direction that an actor's face is oriented. Specifically, an actor at a first location may move their head to the right to get a better view of a remote location on a display. In response to the head movement, a camera at the remote location may move to the right to provide a better view of the remote location on the display. Inferred information determined based on image data, including a face of an actor, may be useful for other applications as well.

FIG. 1 shows an example physical space 100 having one or more sensors 102-103. A physical space may define a portion of an environment in which people, objects, and/or machines may be located. The physical space may take on a two-dimensional or a three-dimensional form and may be used for various purposes. For instance, the physical space may be used as a retail space where the sale of goods and/or services is carried out between individuals (or businesses) and consumers. While various aspects of the disclosure are discussed below in the context of a general space, example implementations are not limited to general spaces and may extend to a variety of other physical spaces such as retail spaces, manufacturing facilities, distribution facilities, office spaces, shopping centers, festival grounds, and/or airports, among other examples. Although only one physical space 100 is shown in FIG. 1, example implementations may be carried out in the context of a plurality of physical spaces.

Example sensors in a physical space (e.g., one or more sensors 102-103) may include but are not limited to: force sensors, proximity sensors, motion sensors (e.g., an inertial measurement units (IMU), gyroscopes, and/or accelerometers), load sensors, position sensors, thermal imaging sensors, facial recognition sensors, depth sensors (e.g., RGB-D, laser, structured-light, and/or a time-of-flight camera), point cloud sensors, ultrasonic range sensors, infrared sensors, Global Positioning System (GPS) receivers, sonar, optical sensors, biosensors, Radio Frequency identification (RFID) systems, Near Field Communication (NFC) chip, wireless sensors, compasses, smoke sensors, light sensors, radio sensors, microphones, speakers, radars, touch sensors (e.g., capacitive sensors), cameras (e.g., color cameras, grayscale cameras, and/or infrared cameras), and/or range sensors (e.g., ultrasonic and/or infrared), among others.

Additionally, the sensors may be positioned within or in the vicinity of the physical space, among other possible locations. Further, an example implementation may also use sensors incorporated within existing devices such as mobile phones, laptops, and/or tablets. These devices may be in the possession of people located in the physical space such as consumers and/or employees within a retail space. Additionally or alternatively, these devices may be items on display, such as in a retail space used for selling consumer electronics. Yet further, each physical space 100 may include the same combination of sensors or different combinations of sensors.

FIG. 1 also depicts a computing system 104 that may receive data from the sensors 102-103 positioned in the physical space 100. In particular, the sensors 102-103 may provide sensor data to the computing system by way of communication link 120. Communication link 120 may include one or more wired links and/or wireless links (e.g., using various wireless transmitters and receivers). A wired link may include, for example, a parallel bus or a serial bus such as a Universal Serial Bus (USB). A wireless link may include, for example, Bluetooth, IEEE 802.11(IEEE 802.11 may refer to IEEE 802.11-2007, IEEE 802.11n-2009, or any other IEEE 802.11 revision), Cellular (such as GSM, GPRS, CDMA, UMTS, EV-DO, WiMAX, HSPDA, or LTE), or Zigbee, among other possibilities. Furthermore, multiple wired and/or wireless protocols may be used, such as "3G" or "4G" data connectivity using a cellular communication protocol (e.g., CDMA, GSM, or WiMAX, as well as for "Wi-Fi" connectivity using 802.11).

In other examples, the arrangement may include access points through which one or more sensors 102-103 and/or computing system 104 may communicate with a cloud server. Access points may take various forms such as the form of a wireless access point (WAP) or wireless router. Further, if a connection is made using a cellular air-interface protocol, such as a CDMA or GSM protocol, an access point may be a base station in a cellular network that provides Internet connectivity by way of the cellular network. Other examples are also possible.

Computing system 104 is shown to include one or more processors 106, data storage 108, program instructions 110, and power source(s) 112. Note that the computing system 104 is shown for illustration purposes only as computing system 104, but may include additional components and/or have one or more components removed without departing from the scope of the disclosure. Further, note that the various components of computing system 104 may be arranged and connected in any manner.

Each processor, from the one or more processors 106, may be a general-purpose processor or a special purpose processor (e.g., digital signal processors, application specific integrated circuits, etc.). The processors 106 can be configured to execute computer-readable program instructions 110 that are stored in the data storage 108 and are executable to provide the functionality of the computing system 104 described herein. For instance, the program instructions 110 may be executable to provide for processing of sensor data received from one or more sensors 102-103.

The data storage 108 may include or take the form of one or more computer-readable storage media that can be read or accessed by the one or more processors 106. The one or more computer-readable storage media can include volatile and/or non-volatile storage components, such as optical, magnetic, organic or other memory or disc storage, which can be integrated in whole or in part with the one or more processors 106. In some implementations, the data storage 108 can be implemented using a single physical device (e.g., one optical, magnetic, organic or other memory or disc storage unit), while in other implementations, the data storage 108 can be implemented using two or more physical devices. Further, in addition to the computer-readable program instructions 110, the data storage 108 may include additional data such as diagnostic data, among other possibilities. Further, the computing system 104 may also include one or more power source(s) 112 configured to supply power to various components of the computing system 104. Any type of power source may be used such as, for example, a battery. In some embodiments, the computing system 104 may include more, fewer, and/or different components than those shown in FIG. 1.

Figure 2A:
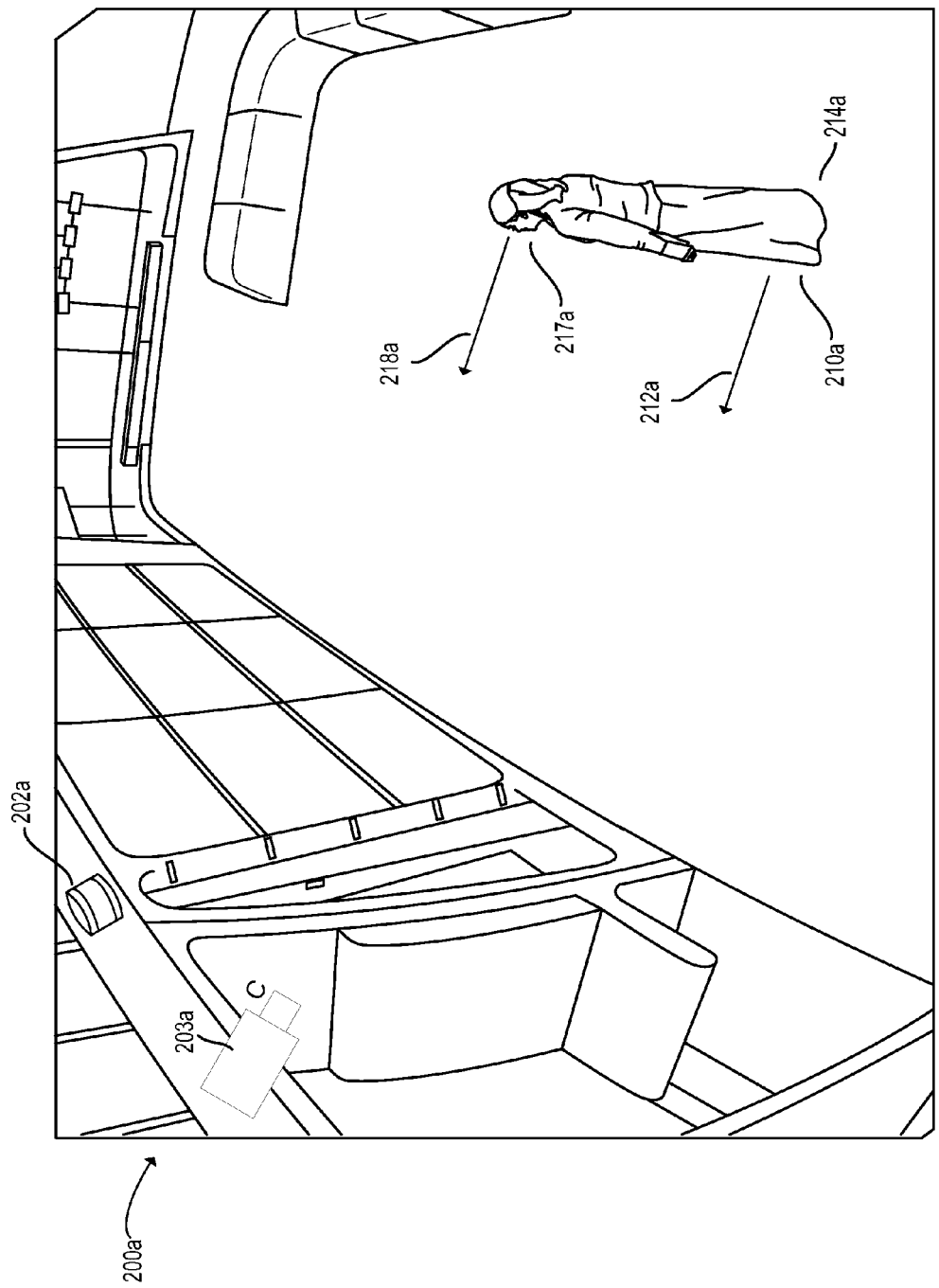
FIG. 2A illustrates an example environment with an actor, according to an example embodiment.
Figure 2B:
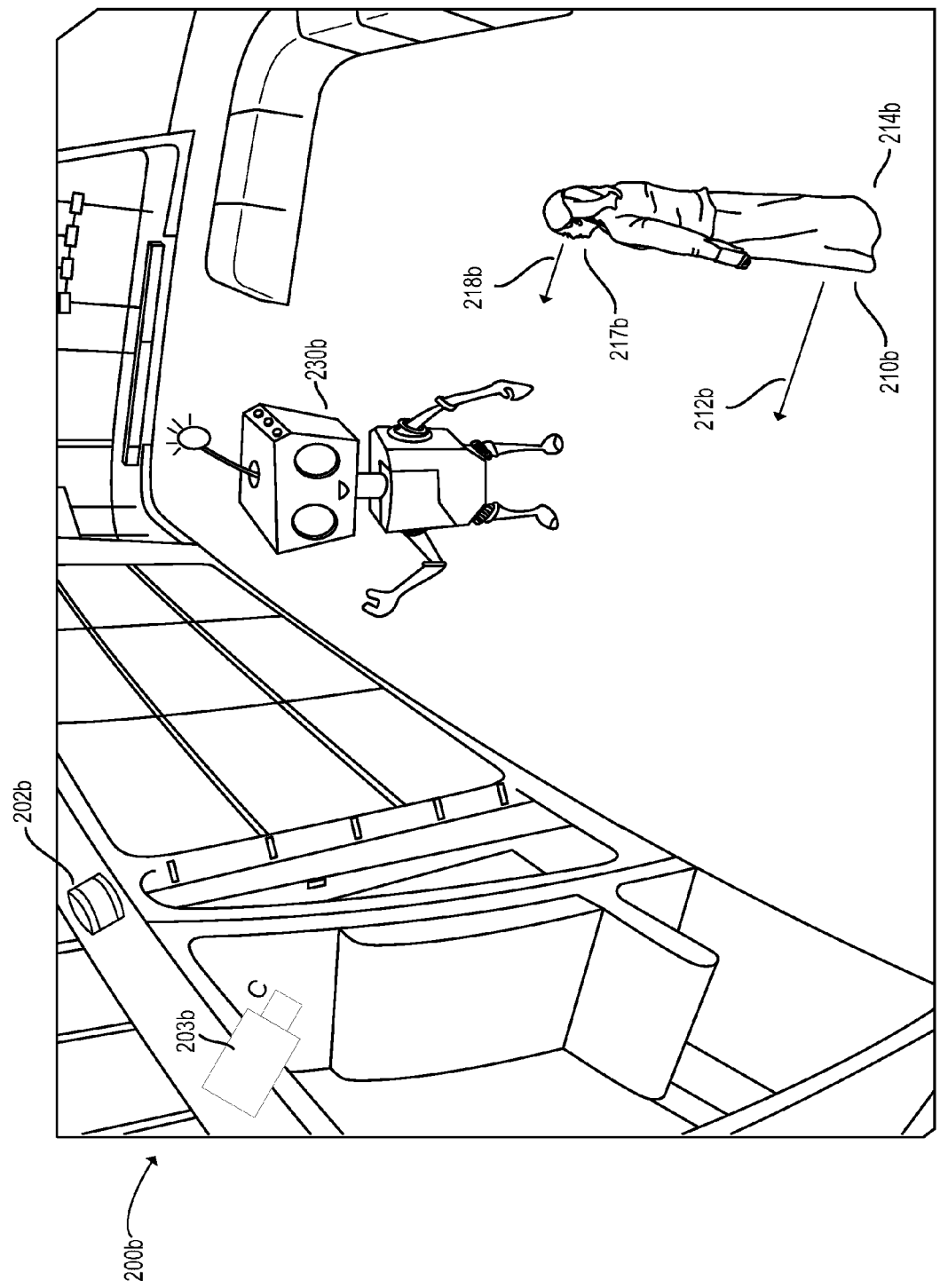
FIG. 2B illustrates another example environment with an actor and a robotic device, according to an example embodiment.

FIGS. 2A and 2B display example embodiments of an environment with one or more sensors. In FIG. 2A, the environment 200a includes a sensor 202a, a sensor 203a, and an actor 210a at location 214a. In FIG. 2B, the environment 200b includes a sensor 202b, a sensor 203b, an actor 210b at location 214b, and a robotic device 230b. In FIG. 2A, the direction of the actor 210a is shown by vector 212a, while the direction of the face of the actor 217a is shown by vector 218a. In FIG. 2B, the direction of the actor 210b is shown by vector 212b, while the direction of the face of the actor 217b is shown by vector 218b. In FIGS. 2A and 2B, more, fewer, and/or different objects may be included in environments 200a and/or 200b.

The environments 200a and 200b displayed in FIGS. 2A and 2B may correspond to one or more physical spaces. In the displayed embodiments, the environment corresponds to one physical space, such as physical space 100 described in FIG. 1. The physical space may be used for a variety of purposes, including retail, manufacturing, assembly, distribution, business, healthcare, and/or other purposes. In other embodiments, the environments 200a and/or 200b may include multiple physical spaces, with each physical space having one or more sensors, such as sensors 102 and 103 described in FIG. 1. For example, a home may be an environment with multiple rooms (bedroom, kitchen, bathroom, dining room, etc.) corresponding to multiple physical spaces, with each physical space having one or more sensors. Other embodiments of environments 200a and/or 200b may also be possible.

In FIGS. 2A and 2B, the sensors 202a and 202b are LIDAR sensors used to collect point cloud data of detected objects within the environment. Although a spinning LIDAR sensor is displayed, other types of sensors, including motion capture sensors, thermal imaging sensors, different types of LIDAR sensors, or other depth sensors, may be used instead to obtain point cloud data or other types of data for detecting objects. While the displayed embodiments only show one point cloud data sensor, in other embodiments, multiple point cloud data sensors may be located throughout the environment.

In FIGS. 2A and 2B, the sensors 203a and 203b are image capture devices used to collect image data of locations in the environment. The image capture device may be a camera, including PTZ cameras (pan-tilt-zoom), stationary cameras, moving cameras, color cameras, grayscale cameras, and/or some other sensor that receives image data of a location. While the displayed embodiments only show one sensor receiving image data within the environment, in other embodiments, multiple sensors that receive image data of a location may be located throughout the environment. Further, the sensors 202a, 202b, 203a, and 203b may be stationary, moving, or some combination of the two while in the environment.

For example, sensor(s) 202b and/or 203b may be attached to a robotic device 230b. In this case, when the robotic device 230b is stationary, the attached sensor(s) 202b and/or 203b may also be stationary. However if the robotic device 230b is moving, then the attached sensor(s) 202b and/or 203b would also be moving. Alternatively, the sensors may be attached to fixed locations within the environment, as shown by sensors 202a, 202b, 203a, and 203b in FIGS. 2A and 2B, respectively. Sensors 202a and 202b obtain point cloud data of one or more detected actors at a location within the environment. Sensors 203a and 203b receive image data of one or more locations within the environment.

In FIGS. 2A and 2B, an actor (210a and 210b, respectively) is displayed at a location (214a and 214b, respectively) within the environment. The actor may be stationary at one location, moving from one location to another location, or a combination of both over a period of time. If the actor is stationary at one location, the actor may be sitting, standing, lying down, or stationary in some other way at a location while oriented a particular direction. Alternatively, if the actor is moving from one location to another location, the actor may be walking, running, jumping, or moving in some other way from one location to another location along a particular direction. The actor may be a person, a robotic device, or some other object that can face a direction or move along a direction.

In FIGS. 2A and 2B, the displayed actor has a corresponding direction 212a and 212b, respectively. When the actor is stationary, the direction corresponds to the direction the actor is oriented. Alternatively, when the actor is moving, the direction describes the direction the actor is moving along. Directions 212a and 212b may be representative of a three-dimensional vector describing the direction that the actor is oriented or moving in FIGS. 2A and 2B. Alternatively, directions 212a and 212b may describe a two-dimensional vector describing the direction that the actor is oriented or moving in FIGS. 2A and 2B.

In FIGS. 2A and 2B, the face of the actor (217a and 217b, respectively) has a corresponding direction 218a and 218b, respectively. Based on image data received by sensors 203a and 203b, the system 104 from FIG. 1 may determine a corresponding direction 218a and 218b, respectively, of the face of the actor. The system may determine the direction of the actor 212a and 212b based on the determined directions 218a and 218b, respectively. In the displayed embodiments, the direction vectors 218a and 218b are parallel to direction vectors 212a and 212b, respectively. In other embodiments, the directions 218a and 218b may be offset, or different, from the directions 212a and 212b, respectively.

While image data of the face of the actor can be used to determine the direction of the actor, image data of other parts of the actor may also be used. In the displayed embodiments, the actor has parts including a head, a body, one or more arms, and one or more legs. An actor may include more, fewer, and/or different parts than those described. In some embodiments, image data of one or more of these parts of the actor may be used to determine the direction of the actor. Alternatively, image data of the face of the actor may be used to determine information (such as direction) about one or more of the parts of the actor.

FIG. 2B displays robotic device 230b. The operation of the robotic device 230b may be adjusted based on the determined direction 212b of the actor 210b. The robotic device 230b may adjust operations including navigation of the robotic device 230b, teleconferencing between the robotic device 230b and the actor 210b, telepresence of a robotic device user with the actor 210b, or the execution of one or more tasks. Further, in response to the determined direction 212b of the actor 210b, the robotic device 230b may adjust its operation by doing nothing and/or stopping what the robotic device 230b was previously doing. Other operation adjustments by the robotic device 230b are also possible.

The operation of the robotic device 230b may be adjusted based on various data besides, or in addition to, the direction of the actor. For example, robotic device operation may be adjusted based on the direction of the body of the actor, the direction of the face of the actor, the direction of a different part of the actor, historical information indicating previous directions of the actor, or other data. Robotic device operation may be adjusted based on a combination of the aforementioned data. Other criteria are also possible for adjusting robotic device operation.

The system 104 of FIG. 1 may provide information indicating the determined direction 212b to a user/operator that is controlling or assisting the robotic device 230b. The system 104 may rely on a communication link (such as link 120) in connection with a computing device (not shown) of the user or operator of the robotic device 230b. The computing device may be a computer, personal computer, laptop, phone, PDA, tablet, mobile device, wearable computing device, or some other computing device of the user or operator. Other embodiments for providing the information to the user/operator controlling or assisting the robotic device are also possible.

Sensors 203a and/or 203b may be adjusted based on the determined direction of the actor 212a and/or 212b, respectively. Sensors 203a and/or 203b may zoom, pan, tilt, or adjust in some other manner in response to the direction of the actor. One or more sensors 203a and/or 203b may be adjusted in response to the determined direction of the actor. Other adjustments of the sensors 203a and/or 203b based on the direction of the actor may also be possible.

Although FIG. 2B displays sensor 202b as being remotely located from the robotic device 230b, in some embodiments, robotic device 230b may include one or more sensors 202b and/or 203b to detect actor 210b. In some embodiments, the robotic device 230b uses its own attached sensors to detect and determine the direction of the actor 210b. Alternatively, the robotic device 230b may receive communications from system 104 (see FIG. 1) indicating the direction of the actor 210b. Alternatively, the robotic device 230b may receive sensor data from system 104 (see FIG. 1) and then determine the direction 212b of the actor 210b. Other methods of determining the direction of the actor 210b for the robotic device 230b are also possible.

In some embodiments, the robotic device 230b may be the detected actor. In these cases, the robotic device may have characteristics similar to that of the detected actor 210b. For example, the robotic device 230b may be stationary, moving, or a combination of both over a period of time. The direction of the robotic device may be similar to the direction 212b of the detected actor 210b. In particular, the direction of the robotic device 230b as a detected actor may correspond to the direction the robotic device is oriented, the direction the robotic device is moving along, or some other direction of the robotic device. Furthermore, the robotic device direction may be determined based on image data of a face of the robotic device. Also, the system may determine a direction of the face of the robotic device based on the image data of the face of the robotic device.

Figure 3A:
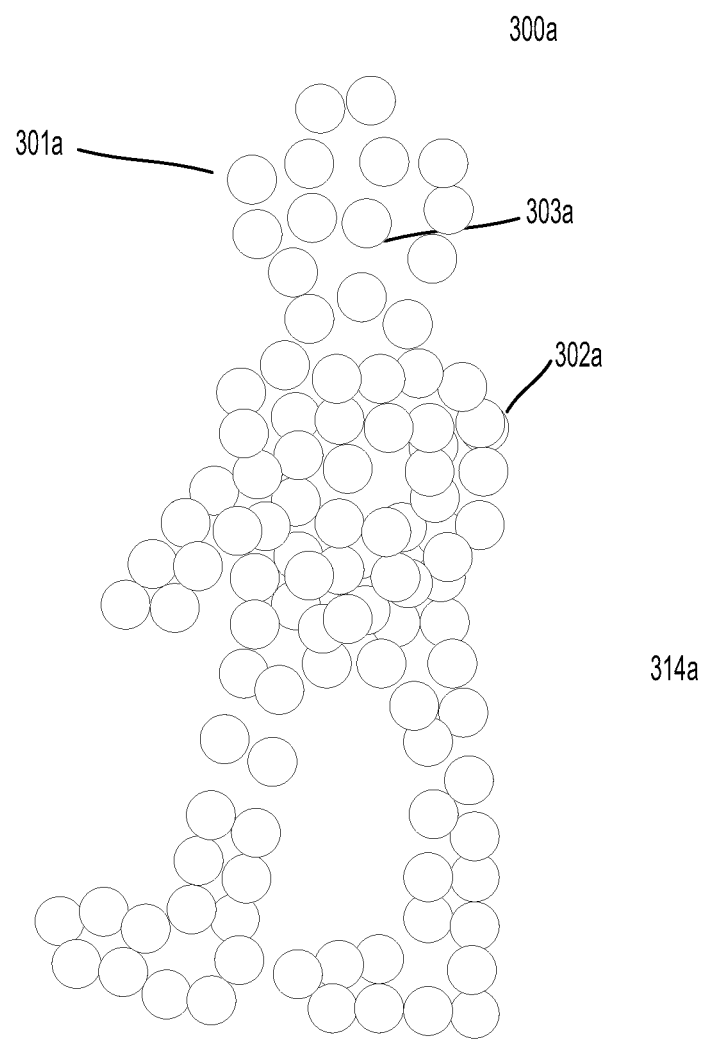
FIG. 3A illustrates an example point cloud representative of an actor, according to an example embodiment.

FIG. 3A displays an example point cloud representative of an actor within an environment, according to an embodiment. FIG. 3A includes point cloud data 300a representative of an actor within an environment. The received point cloud data includes various portions of point cloud data 301a, 302a, and 303a. The point cloud data 300a may be received at a location 314a within the environment. In other embodiments, the point cloud may include more, fewer, and/or different portions of point cloud data. Additionally, the point cloud data may be received for an actor at different locations or more locations than the location shown for FIG. 3A.

Point cloud data 300a may include portions of point cloud data representative of different parts of the actor. Point cloud data 301a may be representative of the head of the actor, while point cloud data 302a may be representative of the body of the actor. In FIG. 3A, the body of the actor may include the actor's arms, legs, torso, and/or other parts. However in other embodiments, the body may refer to fewer parts of the actor (such as the torso) while other parts of the actor may be considered separate portions of point cloud data (such as the arms, legs, etc.).

The point cloud data 300a includes a plurality of points received from one or more sensors within an environment, such as sensors 102, 202a, and/or 202b from FIGS. 1, 2A, and 2B, respectively. Each received point may represent a point on the surface of the actor. The sensor may provide a cluster of points in a particular area of the actor. The cluster of points may then be representative of a part of the actor. For example, the cluster of points identified by 301a may be representative of the head of the actor.

Determining information about the actor based on the received, clustered point cloud data 300a may be challenging for at least three reasons. First, the point cloud data received from the one or more sensors may be sparse. Thus, the point cloud data may not be as rich, as detailed, or have as many points as other sensor data for determining information about an actor.

Second, the point cloud data may have a non-uniform density. Some stripes of received point cloud data may have a high density. But other stripes of received point cloud data may have a low density. Thus, techniques for determining additional information based on the received point cloud data may accommodate point cloud data with varying density values.

Third, the received point cloud data may be prone to blind spots. Blind spots occur when a portion of the environment cannot be sensed by the one or more sensors (such as sensors 102, 202a, and/or 202b displayed in FIGS. 1, 2A, and 2B, respectively) within the environment. A blind spot may occur because a sensor is not present at a portion of the environment.

Alternatively, blind spots may occur due to obstacles and/or occlusions. For example, a blind spot may occur at a portion of the environment due to an object blocking a portion of the environment from sensing by a sensor. For another example, a blind spot may occur at a portion of the environment because another actor or robotic device is located in between the sensor and the portion of the environment. Thus, if an actor was located at a portion of the environment while the robotic device (or another actor) was located in between the sensor and the actor, the robotic device may cause the portion of the environment to become a blind spot. The blind spot may prevent the actor from being detected by the sensor. Additional sensors may be added to the environment to reduce blind spots.

Because the received point cloud data is sparse, has a non-uniform density, and is prone to blind spots, it can be challenging to determine additional information about an actor based on the received point cloud data. Thus, techniques for determining information about an actor (such as the direction of the actor) using the point cloud data may accommodate the characteristics and challenges of the point cloud data. One technique that accommodates these challenges is to collect and process image data of the location (such as location 314a) of the actor. The image data may be processed in combination with the point cloud data to determine the direction of the actor.

Figure 3B:
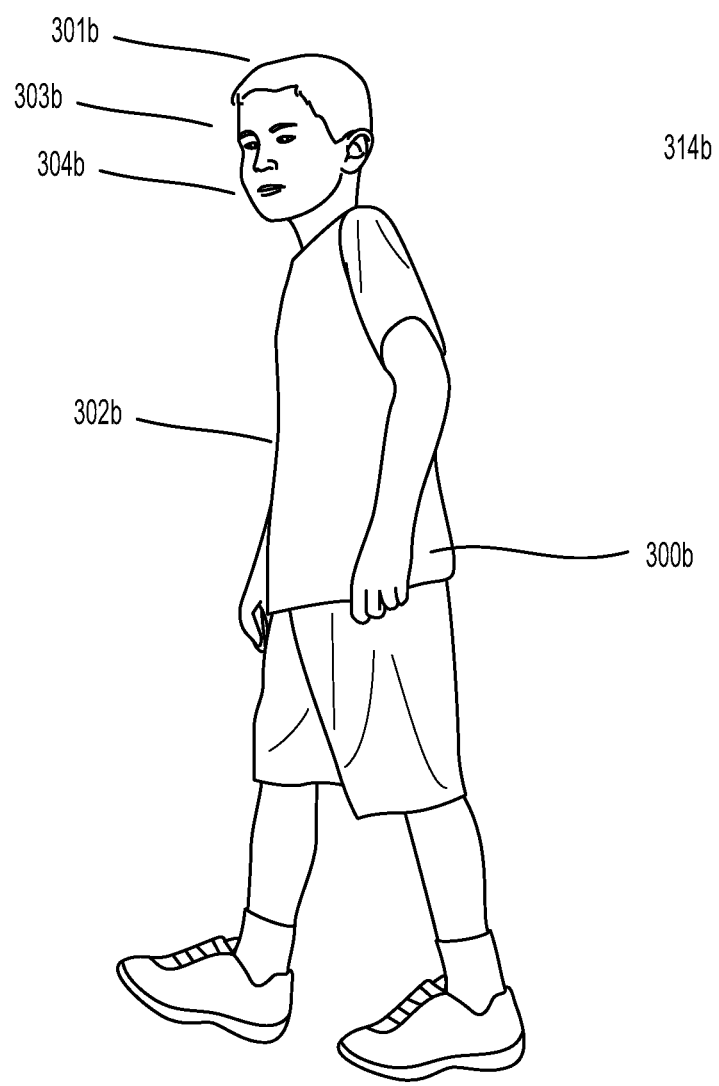
FIG. 3B illustrates example image data representative of a location within an environment, according to an example embodiment.

FIG. 3B displays example image data representative of a location within an environment, according to an example embodiment. FIG. 3B displays image data 310b representative of a location 314b. The image data 310b includes image data of the actor 300b. The image data of actor 300b includes image data for parts of the actor, including image data 301b, 302b, 303b, and 304b. In other embodiments, the image data may include fewer, more, and/or different image data. Additionally, the image data may be received from a different location or more locations than the location shown in FIG. 3B.

Image data 310b displays location 314b. Location 314b may be within a physical space of the environment. Alternatively, location 314b may span multiple physical spaces within the environment. The image data of location 314b may also include portions, or all, of one or more objects (such as actors) at the location 314b.

In FIG. 3B, image data 310b includes image data for an actor 300b at location 314b. In some embodiments, the image data 300b may include a portion, or all, of the actor 300b. In the displayed embodiment, image data 300b includes image data 301b representative of the head of the actor and image data 302b representative of the body of the actor. Image data 301b includes image data 303b representative of the face of the actor and image data 304b representative of one or more facial features of the actor. Image data of the actor may be representative of more, fewer, and/or different parts of an actor than what is displayed in FIG. 3B. Image data 310b may also include image data for multiple actors at location 314b, in some embodiments.

When the image data 310*b* includes one or more objects (such as actors) at location 314*b*, the system may also have received point cloud data for some or all of the objects at location 314*b*. For objects where the system has received point cloud data, the corresponding image data for the objects may be mapped to point cloud data for the one or more objects within the image data. The mapping may be done based on the location 314*b*. Other methods of mapping image data for objects (such as actors) at a location 314*b* to corresponding point cloud data for the objects may also be possible.

For example, referring to FIGS. 3A and 3B, the system (such as system 104 from FIG. 1) may receive image data 310*b* for location 314*b* including image data 300*b* representative of an actor at location 314*b*. At a same or similar time, the system may also receive point cloud data 300*a* representative of an actor at location 314*a*. The location 314*a* may be the same as, or nearby, location 314*b*. The system may determine that the actor at location 314*b* and the actor at location 314*a* are the same actor. Thus, the system may map the image data 300*b* representative of the actor at location 314*b* to the point cloud data 300*a* representative of the actor at location 314*a*. By mapping the image data 300*b* to point cloud data 300*a* the system may then make inferences about point cloud data 300*a* to determine information about the actor.

The system may determine the direction of an actor based on image data representative of the actor that is mapped to point cloud data representative of the actor. The system may first determine that the mapped image data is of a location that is the same as, or similar to, the location of the point cloud data. A portion of the image data that includes a face of the actor may then be identified. The system may then determine a direction of the face of the actor based on the image data. The system may next determine a direction of the actor based on the point cloud data and/or the determined direction of the face of the actor. The system may determine the direction of the actor using various techniques.

Referring to FIGS. 3A and 3B, in one example, the system identifies the face of the actor based on image data 301*b* representative of the head of the actor, image data 303*b* representative of the face of the actor, and image data 304*b* representative of features of the face of the actor. After determining the face of the actor based on the image data, the system may then locate the point cloud data that corresponds to the head of the actor, 301*a*. Once the point cloud data 301*a* is identified, the system may then determine the point cloud data 302*a* that is representative of the body of the actor.

After identifying point cloud data 302*a*, the system may use a bounding box that surrounds a portion, or all of, the point cloud data 302*a* to determine the direction of the body of the actor 302*a*. The direction of the actor may be inferred to be the same as the direction of the body of the actor by the system. Thus, the system determines the direction of the actor by using image data 300*b* to identify point cloud data representative of the body of the actor 302*a*.

In another example, after mapping the image data 301*b* to the point cloud data 301*a*, the system may identify the face of the actor based on image data 301*b*, 303*b*, and 304*b*. After determining the face of the actor, the system may then determine a direction of the face of the actor based on image data 301*b*, 303*b*, and 304*b*. In embodiments where the system infers that the direction of the face of the actor is the same orientation as the direction of the body of the actor, the system may determine the direction of point cloud data 302*a* to be the same orientation as the determined direction of the face of the actor. The system may also infer that the direction of the actor is the same orientation as the direction of the body after the actor. Thus, the system may determine the direction of the actor is the same orientation as the direction of the face of the actor.

In another example, historical information may be used to determine a current direction of the actor. Historical information may include one or more previous directions of the actor. The system may determine a direction of the actor based on received image data, as described in earlier examples. The system may then use historical information of previous directions of the actor to update, and/or confirm, a current determined direction of the actor. Thus, various additional data, such as image data, historical information, and/or other data, can enable inferences about the point cloud data to determine information about the actor, such as the direction of the actor.

Determining inferences can be helpful when the actor conducts movements different from walking forward. For example, the additional data, and inferences that can result from the additional data, can help with determining the direction of the actor when the actor turns, turns his head in a direction different from his body, steps sideways, or does some other movement other than walking forward with his head facing forward. The additional information (such as image data) can also help with determining information about the actor who an actor standing still. Image data may be periodically acquired to improve accuracy of the determined information about the actor.

For example, the system may periodically acquire image data 310*b* to acquire updated image data of the face of the actor. The updated image data may then allow the system to update the determined direction of the face of the actor, the determined point cloud data 302*a*, historical information, or other data used for determining the direction of the actor. The system may then update the determined direction of the actor based on the newly acquired image data 310*b*. The system may acquire image data 310*b* to be used with point cloud data 300*a* to improve a confidence of the determined direction of the actor. The confidence may describe the probability that the determined direction of the actor is correct and may be expressed as a confidence value. Updated image data 310*b* can be useful for situations where the orientations of the directions of the actor and the face of the actor are the same (see FIGS. 2A and 2B) or where the orientations are different, as shown in FIG. 4.

Figure 4:
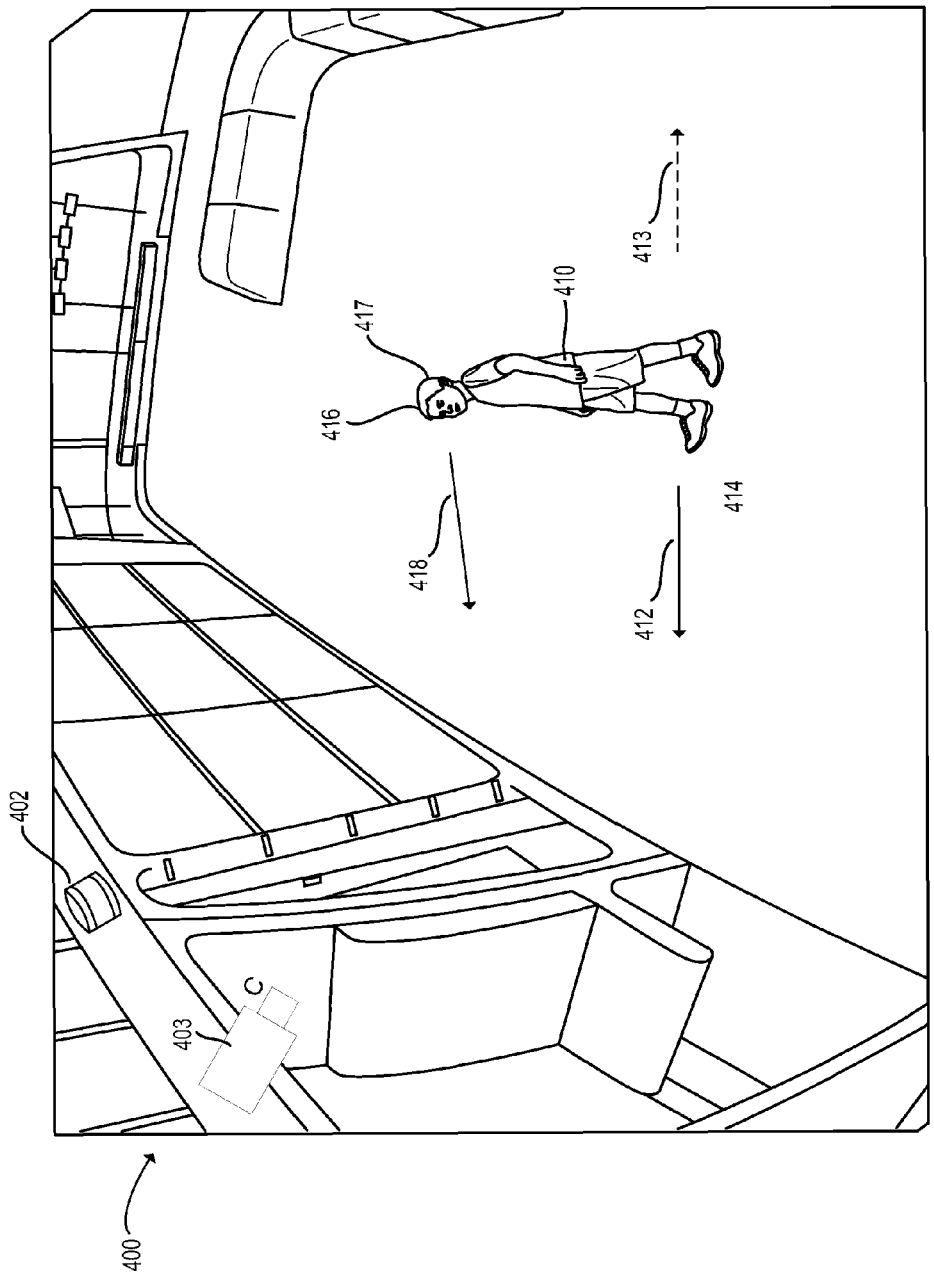
FIG. 4 illustrates another example environment with an actor, according to an example embodiment.

FIG. 4 illustrates an example environment with an actor, according to an embodiment. FIG. 4 displays environment 400 which contains sensor 402, sensor 403, and actor 410. The actor 410 may be located at location 414 while having a direction 412 and a potential direction 413. The actor 410 may include a head 416, which includes a face 417. The head 416 and/or face 417 of the actor 410 may be oriented along direction 418. The environment 400 may include more, fewer, and/or different sensors, actors, and/or directions than those displayed in FIG. 4.

In FIG. 4, the actor 410 is walking along a direction 412. The head of the actor 416 and the face of the actor 417 are oriented along a direction 418. The direction 418 may be different from the direction 412. In one embodiment, the direction 418 may be offset 15° counterclockwise from direction 412. In the displayed embodiment, image data representative of the actor 410 may be used by the system (such as system 104) to make inferences about point cloud data representative of the actor 400. For example, the system may update confidence values of potential directions of the actor using image data representative of the actor 410.

In the displayed embodiment, the system may initially receive point cloud data representative of the actor 410 and determine that the actor 410 may be oriented along directions 412 or 413. Specifically, the system may analyze point cloud data representative of actor 410 to identify parts of the actor, such as the head, torso, legs, or other parts. The system may initially determine potential directions 412 and 413 of the actor 410 based on the location and orientation of the identified parts of the actor. For example, based on the location and orientation of the arms, legs, head, and/or torso within point cloud data for actor 410, the system may determine that the actor is oriented along direction 412 or direction 413. In some embodiments, the system may use historical information (such as previous directions of the actor) to determine and/or update potential directions 412 and 413 of the actor 410.

Direction 413 may be offset 180° from direction 412, and thus, oriented in the opposite direction. Accordingly, the system may initially assign a confidence value of 50% to direction 412 and a confidence value of 50% to direction 413. Thus, the point cloud data initially indicates that actor 410 has a similar or equal likelihood of being oriented along either direction 412 or direction 413. Accordingly, additional data may be needed to determine if the actor 410 is oriented along direction 412 or direction 413.

The system may subsequently receive image data representative of the face of the actor 417 and determine that the direction of the face of the actor is oriented along direction 418. The system may also determine that the direction 418 is offset 15° counterclockwise from the direction 412. Because it may be unlikely, or impossible, for the direction of the face of the actor 417 to be offset from the direction of the torso the actor by 165°, the system may lower the confidence value for direction 413 and increase the confidence value for direction 412. For example, the system may lower the confidence value of direction 413 from 50% to 10% and increase the confidence value of direction 412 from 50% to 90%. The system may then determine the actor 410 is oriented along direction 412 due to the higher confidence value (90%) than that of direction 413 (10%).

Confidence values of one or more potential directions of actors can be updated based on various data. For example, the system may use periodically acquired image data, historical information (such as previous directions of the actor), point cloud data, and/or other data to determine one or more confidence values for one or more potential directions of the actor (such as directions 412 and 413). The system may then determine the actor is oriented along the direction with the highest confidence value (such as direction 412). Although confidence values have been described using percentage values, other units, scales, scores, ratings, or types of measurements may be used to indicate the likelihood of a potential direction of an actor. Other embodiments of the system determining the direction of the actor based on image data and point cloud data are also possible.

Figure 5:
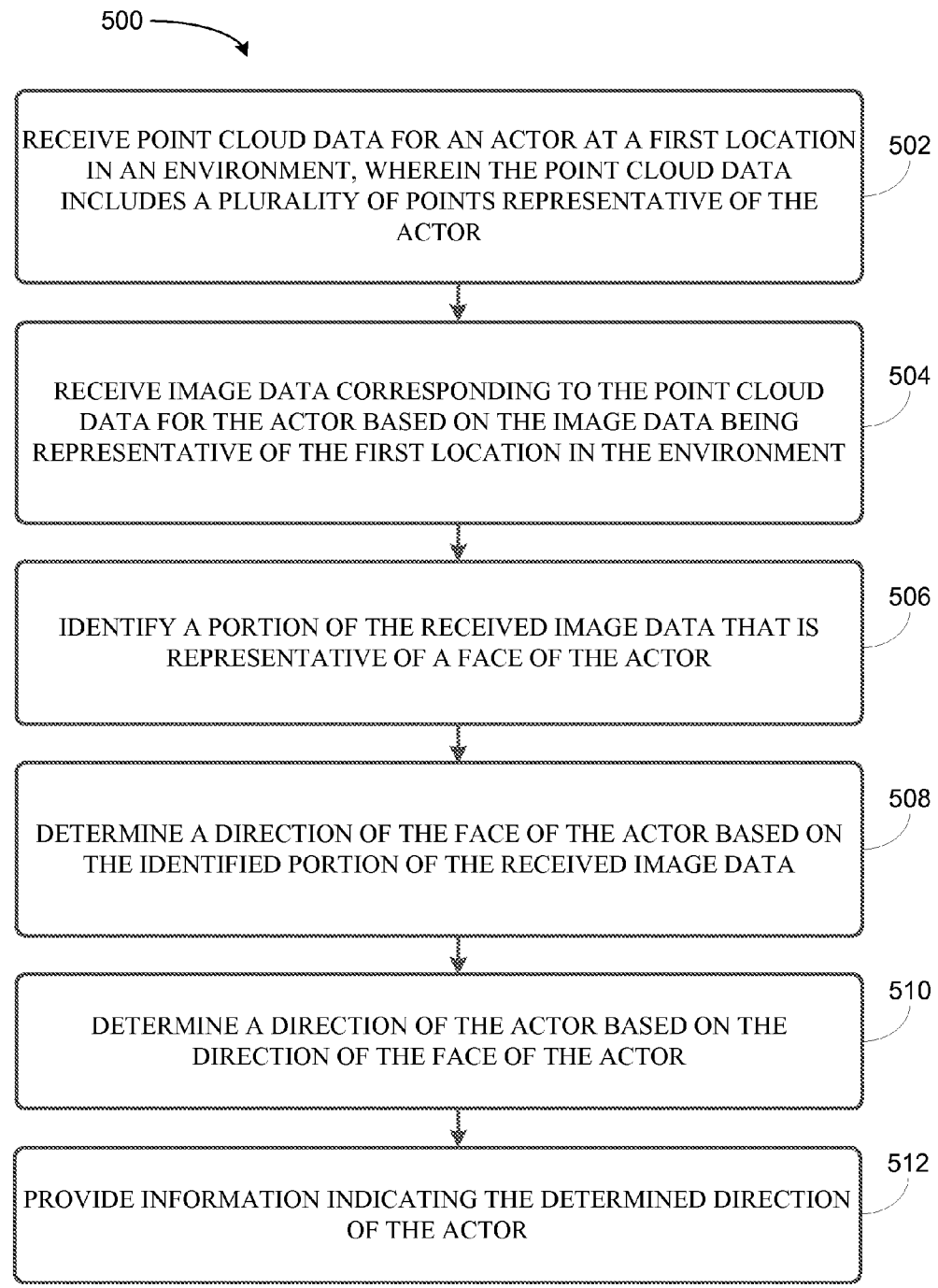
FIG. 5 is a block diagram of an example method, according to an example embodiment.

FIG. 5 illustrates a flowchart showing the method 500 that may allow for determining the direction of an actor based on sensors in an environment, according to an example embodiment. The method 500 may be executed by a control system, such as computing system 104 shown in FIG. 1. Alternatively, the method may be executed by a robotic device, such as the robotic device 230*b* displayed in FIG. 2B. Other devices or systems may execute method 500 in other embodiments.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 5. Where used, program code can be stored on any type of computer-readable medium, for example, such as a storage device including a disk or hard drive.

In addition, each block of the flowchart shown in FIG. 5 may represent circuitry that is wired to perform the specific logical functions in the process. Unless specifically indicated, functions in the flowchart shown in FIG. 5 may be executed out of order from that shown or discussed, including substantially concurrent execution of separately described functions, or even in reverse order in some examples, depending on the functionality involved, so long as the overall functionality of the described method is maintained.

As shown by block 502 of FIG. 5, method 500 may involve receiving point cloud data for an actor at a first location in an environment, wherein the point cloud data includes a plurality of points representative of the actor. In some examples, the point cloud data may be received by one or more LIDAR sensors attached at a fixed location within the environment, located on a mobile robot in the environment, and/or located elsewhere in the environment. In other examples, the point cloud data may include a plurality of points which represent the surface of the detected actor. In some other examples, the received point cloud data may be sparse with a non-uniform density. In additional examples, techniques may be used to accommodate the sparse point cloud data with a non-uniform density.

Method 500 may further involve receiving image data corresponding to the point cloud data for the actor based on image data being representative of the first location in the environment, as displayed by block 504 in FIG. 5. In some examples, portions, or all, of the image data may be mapped to corresponding point cloud data. In additional examples, the image data may be received by one or more cameras. In other examples, the one or more cameras may be attached at a fixed location within the environment, located on a mobile robot in the environment, and/or located elsewhere in the environment.

Method 500 may also involve identifying a portion of the received image data that is representative of a face of the actor, as displayed by block 506 in FIG. 5. In some examples, features of the face of the actor may be used to identify the image data representative of the face of the actor. In additional examples, point cloud data representative of a body of the actor may be identified after identifying a face of the actor. In other examples, a bounding box surrounding a portion, or all, of the point cloud data representative of the body of the actor may be used to determine information about the actor (such as the direction of the actor). In some other examples, image data representative of the face of the actor may be periodically acquired to update the information determined about the actor.

The method 500 may additionally involve determining a direction of the face of the actor based on the identified portion of the received image data, as shown by block 508 in FIG. 5. In some examples, the direction of the face of the actor may be used to infer the direction of the actor. In additional examples, the direction of the actor may be inferred to be the same as the direction of the face of the actor.

Method 500 may also include determining a direction of the actor based on the direction of the face of the actor, as can be seen by block 510 in FIG. 5. In some examples, the direction of the actor may be determined based on one or more confidence values of one or more potential directions of the actor. In additional examples, the potential direction of the actor with the highest confidence value may be selected as the direction of the actor. In some other examples, historical information may be used in combination with the image data and point cloud data to determine a current direction of the actor.

Method 500 may also involve providing information indicating the determined direction of the actor, as shown by block 512 in FIG. 5. In some examples, information indicating the direction of the actor may be provided to a user or an operator of a robotic device. In additional examples, the user or operator may adjust the operation of the robotic device based on the provided information indicating the direction of the actor. In other examples, the robotic device may be the actor detected within the environment.

Although not displayed in FIG. 5, method 500 may include additional steps, such as adjusting operation of a robot based on the determined direction of the actor. In some examples, the navigation of the robot may be adjusted based on the determined direction of the actor. However, the robot could be adjusted to operate in a different way in response to the determined direction of the actor.

Various applications and environments using sensors to determine the direction of an actor in the environment are possible for the disclosed systems and methods. For example, some environments where determination of the direction of an actor within the environment may be applicable include manufacturing facilities, mailing or shipping facilities, airports, hospitals, or other environments employing sensors for detecting actors. Furthermore, other applications where determination of the direction of an actor within an environment may be applicable include construction, shipping, manufacturing, healthcare, and/or other applications using environments with sensors. Other applicable environments and applications for the disclosed systems and methods may also be possible.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
  receiving point cloud data for an actor at a first location in an environment, wherein the point cloud data includes a plurality of points representative of the actor;
  receiving image data corresponding to the point cloud data for the actor based on the image data being representative of the first location in the environment;
  identifying a portion of the received image data that is representative of a face of the actor;
  determining a direction of the face of the actor based on the identified portion of the received image data;
  determining a direction of the actor based on the direction of the face of the actor; and
  providing information indicating the determined direction of the actor.

2. The method of claim 1, further comprising:
  determining a direction the actor is moving based at least on the received point cloud data and the direction of the face; and
  providing information indicative of the direction the actor is moving.

3. The method of claim 1, further comprising:
  determining a direction of a body of the actor based at least on the received point cloud data and the direction of the face of the actor; and providing information indicative of the direction of the body of the actor.

4. The method of claim 3, wherein the direction of the body of the actor is different from the determined direction of the face of the actor.

5. The method of claim 1, wherein the image data is received from one or more image capturing devices.

6. The method of claim 1, further comprising:
adjusting an image capture device based at least on the determined direction of the actor.

7. The method of claim 1, further comprising:
receiving historical information indicating one or more previous directions of the actor;
determining a current direction of the actor based at least on the received point cloud data, the historical information, and the direction of the face of the actor; and
providing information indicating the current direction of the actor.

8. A non-transitory computer-readable medium storing instructions that are executable by one or more computing devices, wherein executing the instructions causes the one or more computing devices to perform functions comprising:
receiving point cloud data for an actor at a first location in an environment, wherein the point cloud data includes a plurality of points representative of the actor;
receiving image data corresponding to the point cloud data for the actor based on the image data being representative of the first location in the environment;
identifying a portion of the received image data that is representative of a face of the actor;
determining a direction of the face of the actor based on the identified portion of the received image data;
determining a direction of the actor based on the direction of the face of the actor; and
providing information indicating the determined direction of the actor.

9. The non-transitory computer-readable medium of claim 8, wherein executing the instructions further causes the one or more computing devices to perform functions comprising:
determining a direction the actor is moving based at least on the received point cloud data and the direction of the face; and
providing information indicative of the direction the actor is moving.

10. The non-transitory computer-readable medium of claim 8, wherein executing the instructions further causes the one or more computing devices to perform functions comprising:
determining a direction of a body of the actor based at least on the received point cloud data and the direction of the face of the actor; and
providing information indicative of the direction of the body of the actor.

11. The non-transitory computer-readable medium of claim 10, wherein the direction of the body of the actor is different from the determined direction of the face of the actor.

12. The non-transitory computer-readable medium of claim 8, wherein executing the instructions further causes the one or more computing devices to perform functions comprising:
providing instructions for a robotic device to navigate based at least on the determined direction of the actor.

13. The non-transitory computer-readable medium of claim 8, wherein the point cloud data has a non-uniform density.

14. The non-transitory computer-readable medium of claim 8, wherein the point cloud data is received from one or more LIDAR sensors and the image data is received from one or more image capturing devices.

15. A robotic device comprising:
one or more processors; and
a memory storing instructions that when executed by the one or more processors cause the robotic device to perform functions comprising:
receiving point cloud data for an actor at a first location in an environment, wherein the point cloud data includes a plurality of points representative of the actor;
receiving image data corresponding to the point cloud data for the actor based on the image data being representative of the first location in the environment;
identifying a portion of the received image data that is representative of a face of the actor;
determining a direction of the face of the actor based on the identified portion of the received image data;
determining a direction of the actor based on the direction of the face of the actor; and
adjusting operation of the robotic device based on the determined direction of the actor.

16. The robotic device of claim 15, wherein the instructions further cause the robotic device to perform functions comprising:
determining a direction the actor is moving based at least on the received point cloud data and the direction of the face; and
adjusting operation of the robotic device based on the direction the actor is moving.

17. The robotic device of claim 15, wherein the instructions further cause the robotic device to perform functions comprising:
determining a direction of a body of the actor based at least on the received point cloud data and the direction of the face of the actor; and
adjusting operation of the robotic device based on the direction of the body of the actor.

18. The robotic device of claim 17, wherein the direction of the body of the actor is different from the determined direction of the face of the actor.

19. The robotic device of claim 15, wherein the instructions further cause the robotic device to perform functions comprising:
navigating the robotic device based at least on the determined direction of the actor.

20. The robotic device of claim 15, wherein the instructions further cause the robotic device to perform functions comprising:
receiving historical information indicating one or more previous directions of the actor;
determining a current direction of the actor based at least on the received point cloud data, the historical information, and the direction of the face of the actor; and
adjusting operation of the robotic device based on the current direction of the actor.

* * * * *